United States Patent [19]
Shaw et al.

[11] Patent Number: 4,676,585
[45] Date of Patent: Jun. 30, 1987

[54] CONTINUOUSLY VARIABLE FIBER OPTIC DELAY LINE

[75] Inventors: Herbert J. Shaw, Stanford, Calif.; John E. Bowers, Holmdel, N.J.; Steven A. Newton, Menlo Park, Calif.

[73] Assignee: The Board of Trustees of the Leland Stanford Junior University, Stanford, Calif.

[21] Appl. No.: 637,042
[22] PCT Filed: Nov. 12, 1982
[86] PCT No.: PCT/US82/01609
§ 371 Date: Jul. 9, 1984
§ 102(e) Date: Jul. 9, 1984
[87] PCT Pub. No.: WO84/02006
PCT Pub. Date: May 24, 1984

[51] Int. Cl.⁴ ............................................. G02B 6/26
[52] U.S. Cl. ............................... 350/96.15; 350/96.29
[58] Field of Search ................. 350/96.1, 96.15, 96.16, 350/96.29, 96.30

[56] References Cited

U.S. PATENT DOCUMENTS

| | | | |
|---|---|---|---|
| 3,957,341 | 5/1976 | Taylor | 350/96 C |
| 4,136,929 | 1/1979 | Suzaki | 350/96.15 |
| 4,302,071 | 11/1981 | Winzer | 350/96.20 |
| 4,307,933 | 12/1981 | Palmer | 350/96.16 |
| 4,342,499 | 8/1982 | Hicks, Jr. | 350/96.15 |

FOREIGN PATENT DOCUMENTS

| | | |
|---|---|---|
| 3038048 | 10/1981 | Fed. Rep. of Germany . |
| 54-101334 | 9/1979 | Japan . |
| 54-151048 | 11/1979 | Japan . |

OTHER PUBLICATIONS

Applied Optics, vol. 20, No. 15, Aug. 1, 1981, F. J. Liao, et al., "Single Mode Fiber Coupler", pp. 2731–2734.
Applied Optics, vol. 20, No. 14, Jul. 15, 1981, O. Parriaux, et al., "Distributed Coupling on Polished Single-Mode Optical Fibers", pp. 2420–2423.
Electronics Letters, vol. 16, No. 7, Mar. 27, 1980, Bergh, et al., "Single-Mode Fibre Optic Directional Coupler", pp. 260–261.
SPIE, vol. 232, 1980 International Optical Computing Conference (1980), Palmer, et al., "Analog Matrix Multiplication by Directional Coupling between Optical Fibers", pp. 157–159.

Primary Examiner—William L. Sikes
Assistant Examiner—Frank González
Attorney, Agent, or Firm—Knobbe, Martens, Olson & Bear

[57] ABSTRACT

A continuously variable optical delay line having a first substrate (66, 70) and a second substrate (95). The first substrate is composed of a quartz block (70) with a large radius of curvature along its length, supporting a silicon substrate (66) having a plurality of longitudinal, parallel v-grooves (68). A single length (121) of single mode optical fiber is wrapped around the first substrate (66, 70) in helical fashion with each loop being secured in one of the v-grooves (68). The portions of the fiber (121) in the v-grooves (68) are lapped and polished to create a flat coupling surface extending laterally and longitudinally across the first substrate (66, 70). The second substrate (91) is composed of a quartz block with a single v-groove holding a segment of single mode fiber (95). The radius of curvature of this v-groove is substantially smaller than that of the first substrate, such that the flat coupling surface of the second substrate (91) is shorter than that of the first substrate (66). The first and second substrates are placed together such that the fiber in the second substrate is coupled to the fiber in the first substrate. By moving (142) the second substrate longitudinally with respect to the first substrate, a continuously variable delay can be obtained. The continuously variable delay line can be combined with a separate discretely variable delay line to create a longer continuous variable delay. The continuous variable delay line can be formed with only one v-groove (68) in the first substrate (66).

5 Claims, 34 Drawing Figures

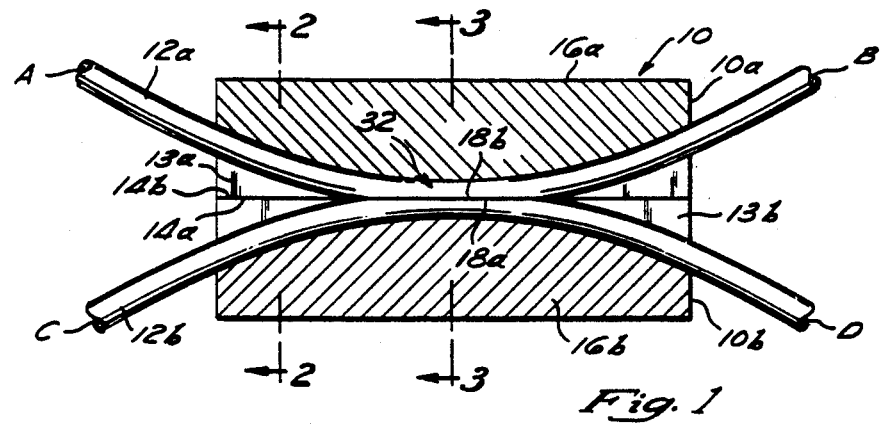

LATERAL OFFSET

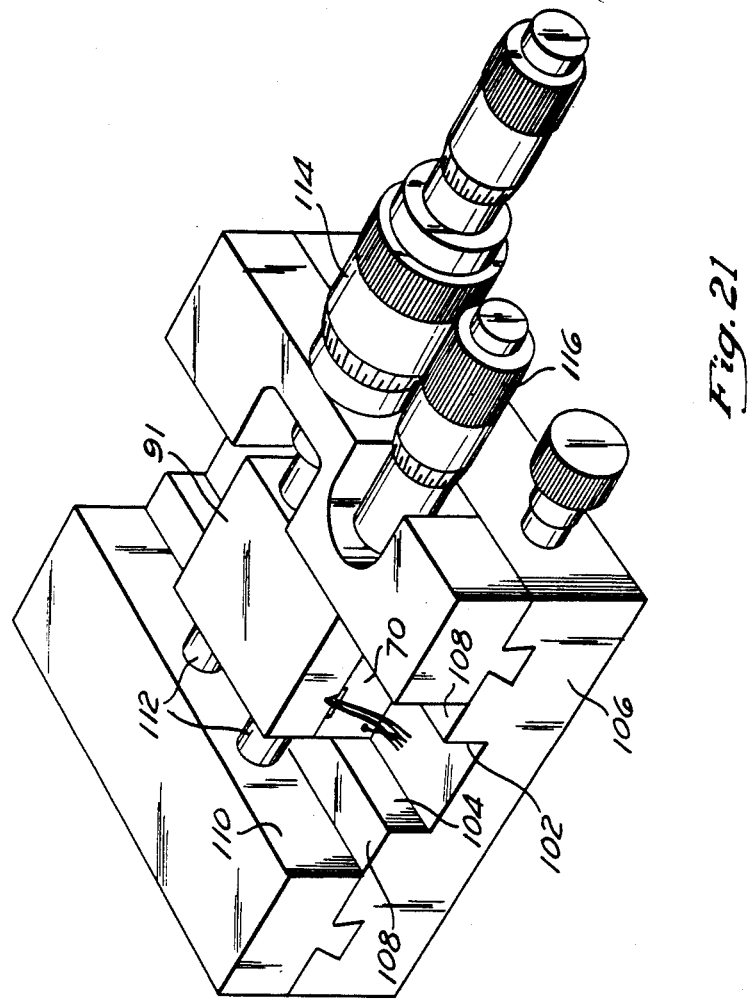

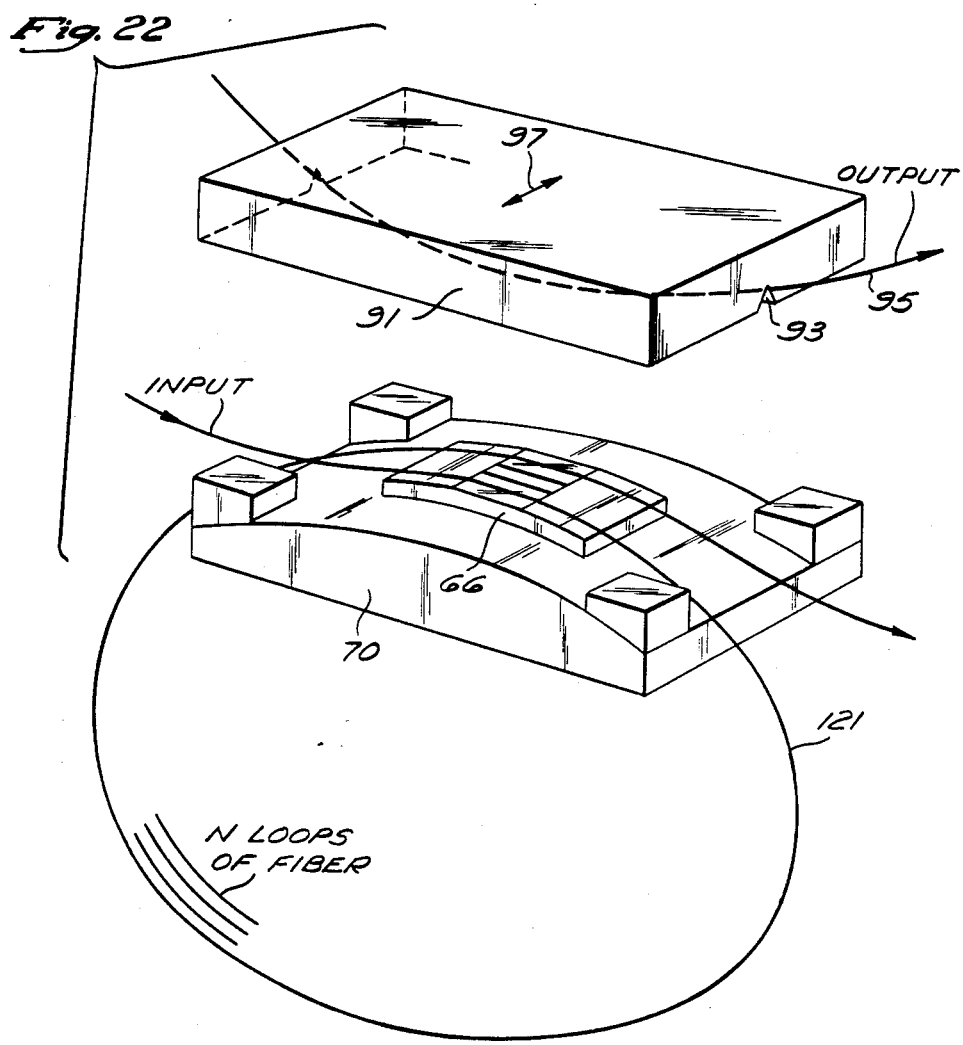

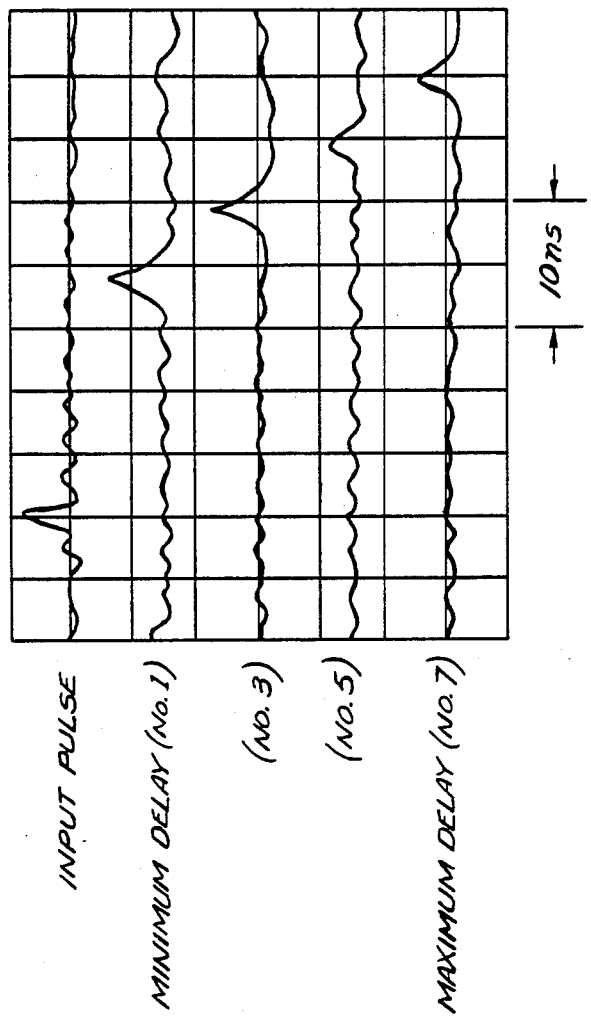
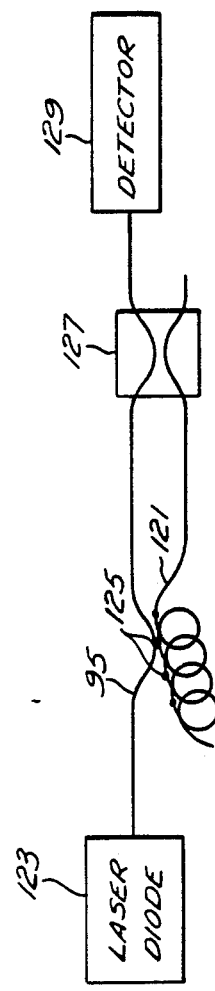

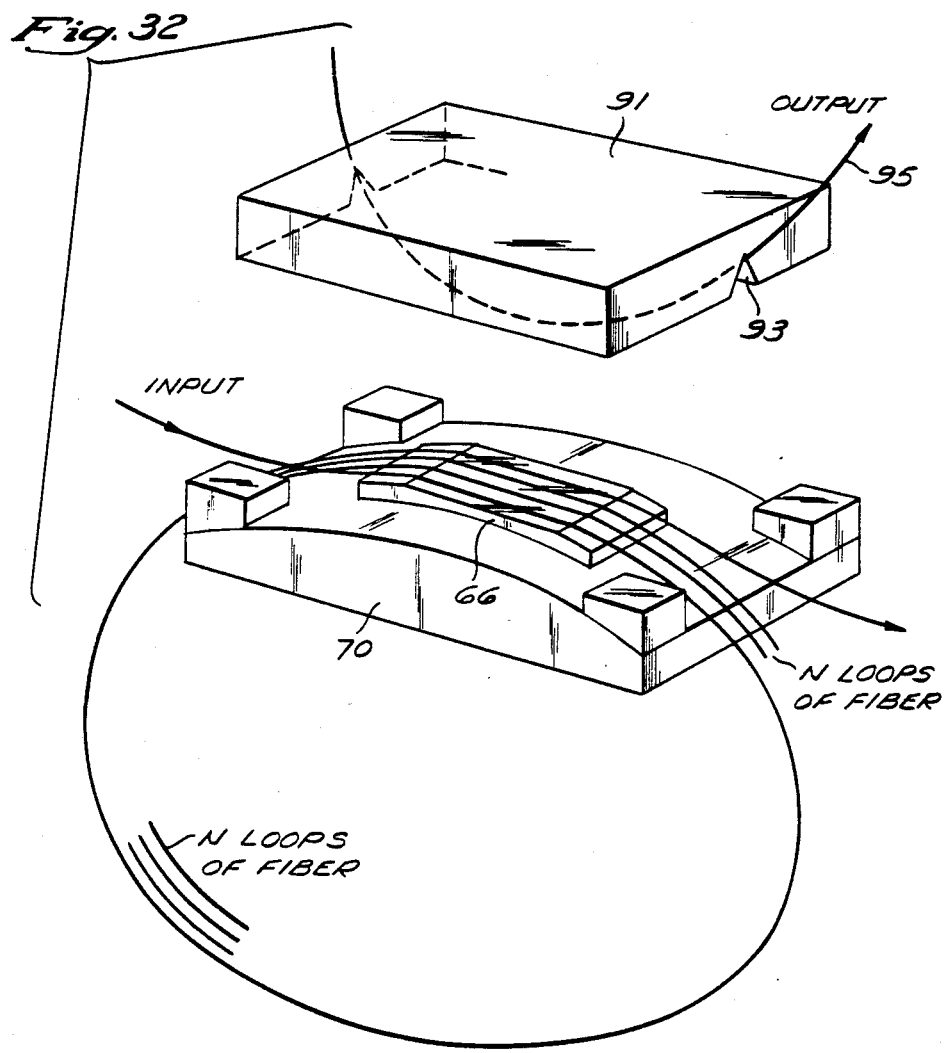

CONTINUOUSLY VARIABLE FIBER OPTIC DELAY LINE

BACKGROUND OF THE INVENTION

This invention relates to the processing of signals transmitted through optical fibers. More particularly the invention is directed to a continuously variable delay line.

The advantages of fiber optic delay lines are well-known in the art. Thus, for example, transversal filters capable of selectively filtering modulated light signals has been taught. Furthermore, the construction of transversal filters by helically wrapping a single fiber optic element around a series of v-grooves in a silicon chip, with taps at each groove, is known in the art. However, because no adjustment of the delay line lengths has been possible in prior art delay lines or transversal filters, the frequency vs. attenuation characteristics of prior transversal filters was of necessity, determined at the time of construction of the filter. There is therefore a need for an adjustable fiber optic delay line so that, for example, the frequency response of a transversal filter utilizing the delay line may be adjusted through a continuous range.

SUMMARY OF THE INVENTION

This invention provides a continuously variable delay line for use with single mode optical fibers. Such a device is useful in a variety of applications. For example, a continuously variable delay line may be used to change the frequency response of a transversal filter.

The invention comprises a single optical fiber, which is wrapped around a plate or chip having parallel v-grooves, so that successive portions of the fiber are mounted in adjacent v-grooves. A portion of the cladding on each optical fiber mounted on the plate or chip is removed along a lateral line normal to the length of the fiber in the v-grooves, thereby simultaneously creating a tap in each fiber portion. Light is selectively coupled from one of the taps by superimposing on the plate or chip, a second v-grooved plate or chip which supports a single optical fiber, the cladding of which has been similarly removed. When the fibers are superimposed, evanescent field coupling occurs between the fibers at a selected one of the taps on the first plate or chip. This selection depends on the relative position of the two plates.

The length of the tap or coupling region of the fiber portions in the first plate or chip is longer than the length of the tap or coupling region of the fiber in the second plate. By adjusting the position of the second plate's coupling region or tap along the length of the first plate's coupling region or tap, the amount of delay can be varied through a continuous range. Thus, the present invention provides a practical continuously variable delay line not heretofore possible.

DETAILED DESCRIPTION OF THE PREFERRED EMBODIMENT

These and other advantages of the present invention are best understood through reference to the drawings, in which:

FIG. 1 is a cross-sectional view of the fiber optic coupler of the present invention, showing a pair of fiber optic strands mounted in respective arcuate grooves of respective bases;

FIGS. 2 and 3 are cross-sectional views of the coupler of FIG. 1, taken along the lines 2—2 and 3—3, respectively;

FIG. 4 is a perspective view of the lower base of the coupler of FIG. 1, separated from the other base, to show its associated fiber mounted thereon, and the oval-shaped, facing surface of the fiber;

FIG. 21 is a perspective view of a fixture used for adjusting the switch of this invention;

FIG. 22 is an exploded perspective view of the discretely variable delay line of this invention;

FIG. 23 is a graph showing the delays for various taps of the delay line of FIG. 22;

FIG. 24 is a schematic diagram of a fiber incorporating the delay line of FIG. 22;

Figure 25A:
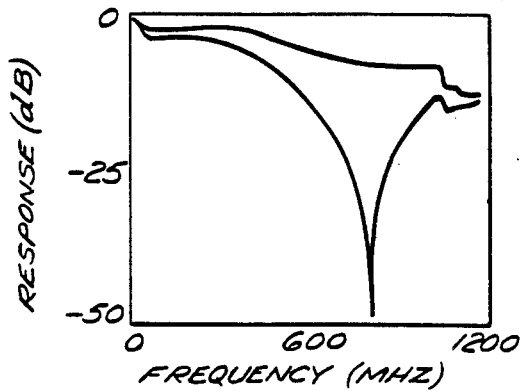
Figure 25B:
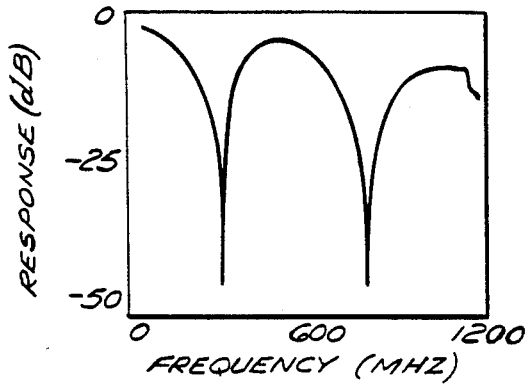
Figure 25C:
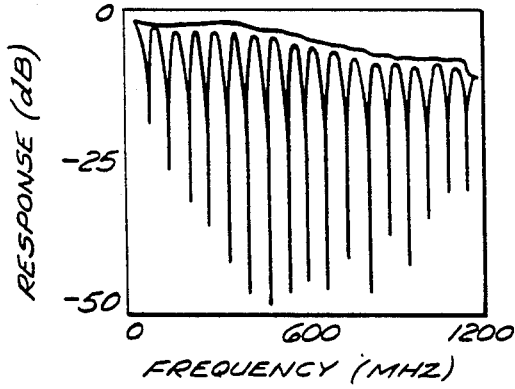

FIGS. 25(a)–(c) are graphs showing the frequency response of the filter of FIG. 24.

Figure 26:
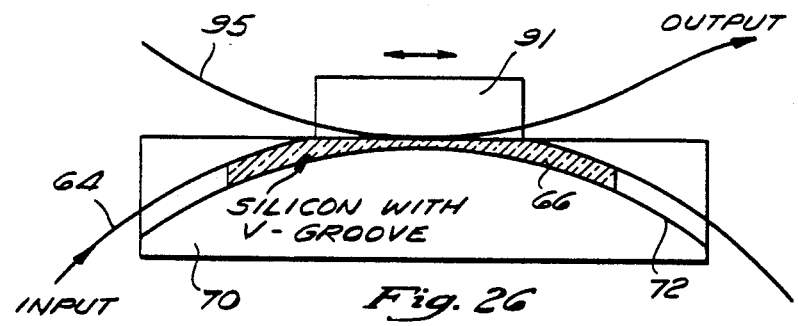
Figure 27:
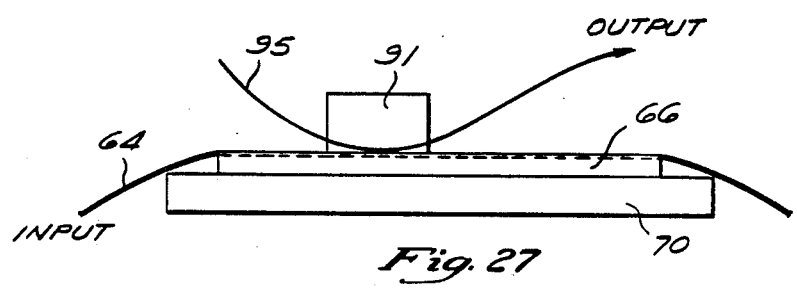
Figure 28:
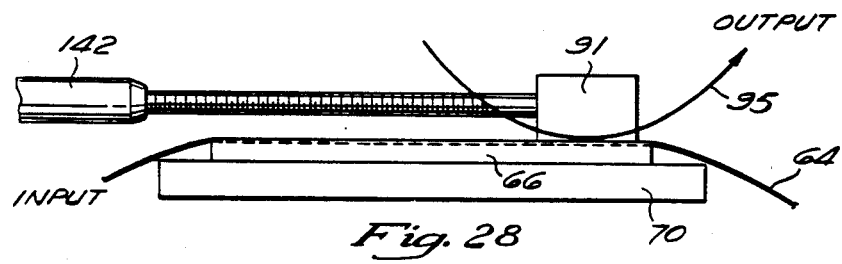
Figure 29:
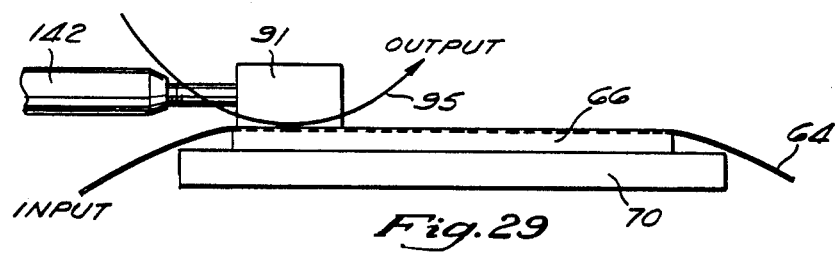
Figure 30:
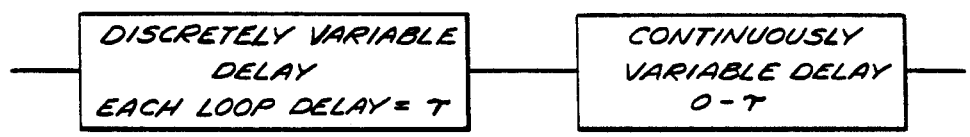
Figure 31:
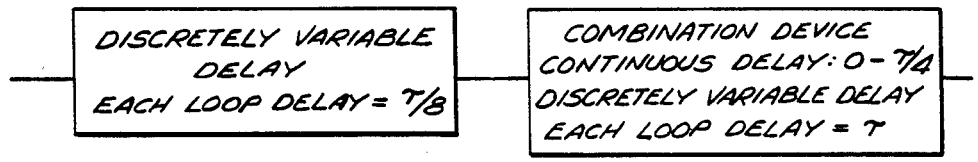

FIG. 26 shows a cross-sectional view of a continuously variable fiber optic coupler;

FIG. 27 shows a cross-sectional view of a continuously variable fiber optic coupler with a flat substrate;

FIGS. 28 and 29 show the FIG. 27 coupler in maximum and minimum delayed positions respectively;

FIGS. 30 and 31 show combinations of discretely variable delay devices with continuously variable delay devices to produce continuously variable delay over relatively long periods of delay;

FIG. 32 shows a single device which combines the discretely variable delay line with the continuously variable delay line.

In order to thoroughly understand the present invention, it is important to first understand the construction and operation of single mode fiber optic evanescent field couplers.

CONSTRUCTION OF EVANESCENT FIELD COUPLER

As illustrated in FIGS. 1 to 4, an evanescent coupler 10 includes two strands 12a and 12b of a single mode fiber optic material mounted in longitudinal arcuate grooves 13a and 13b, respectively, formed in optically flat, confronting surfaces 14a and 14b, respectively, of rectangular bases or blocks 16a and 16b, respectively. The block 16a with the strand 12a mounted in the groove 13 will be referred to as the coupler half 10a, and the block 16b with the strand 12b mounted in the groove 13b will be referred to as the coupler half 10b.

Each of the strands 12a and 12b comprises a commercially available fiber of quartz glass which is doped to have a central core and an outer cladding. It will be seen below that the present invention is particularly advantageous for use with single mode fibers, which typically have a core diameter on the order of 10 microns or less and a cladding diameter on the order of 125 microns, although the invention may also be employed with other types of fibers, such as multi-mode fibers. In the embodiment disclosed, single mode fibers are utilized, however, for clarity of illustration, the diameter of the strands 12 and their respective cores are exageraged. Furthermore, test results described herein are for couplers utilizing single mode fibers.

The arcuate grooves 13a and 13b have a radius of curvature which is vary large compared to the diameter of the fibers 12, and have a width slightly larger than the fiber diameter to permit the fibers 12, when mounted therein, to conform to a path defined by the bottom walls of the grooves 13. The depth of the grooves 13a and 13b varies from a minimum at the center of the blocks 16a and 16b, respectively, to a maximum at the edges of the blocks 16a and 16b, respectively. This advantageously permits the fiber optic strands 12a and 12b, when mounted in the grooves 13a and 13b, respectively, to gradually converge toward the center and diverge toward the edges of the blocks 16a, 16b, thereby eliminating any sharp bends or abrupt changes in direction of the fibers 12 which may cause lower loss through mode perturbation. In the embodiment shown, the grooves 13 are illustrated as being rectangular in cross-section, however, it will be understood that other suitable cross-sectional contours which will accommodate the fibers 12 may be used alternatively, such as a U-shaped cross-section or a V-shaped cross-section. Techniques for forming the grooves 13 and mounting the fibers 12 therein are discussed below.

At the centers of the blocks 16, in the embodiment shown, the depth of the grooves 13 which mount the strands 12 is less than the diameter of the strands 12, while at the edges of the blocks 16, the depth of the grooves 13 is preferably at least as great as the diameter of the strands 12. Fiber optic material was removed from each of the strands 12a and 12b to form the respective oval-shaped planar surfaces 18a, 18b, which are coplanar with the confronting surfaces 17a, 17b, respectively. These surfaces 18a, 18b will be referred to herein as the fiber "facing surfaces". It will be understood that these facing surfaces provide a coupling area or region for the fibers 12a and 12b. Thus, the amount of fiber optic material removed increases gradually from zero towards the edges of the block 16 to a maximum towards the center of the block 16. This tapered removal of the fiber optic material enables the fibers to converge and diverge gradually, which is advantageous for avoiding backward reflection and excess loss of light energy.

In the evanescent coupler shown, the coupler halves 10a and 10b are identical, and are assembled by placing the confronting surfaces 14a and 14b of the blocks 16a and 16b together, so that the facing surfaces 18a and 18b of the strands 12a and 12b are in facing relationship.

An index matching substance (not shown), such as index matching oil, is provided between the confronting surfaces 14. This substance has a refractive index approximately equal to the refractive index of the cladding, and also functions to prevent the optically flat surfaces 14 from becoming permanently locked together. The oil is introduced between the blocks 16 by capillary action.

Figure 5:
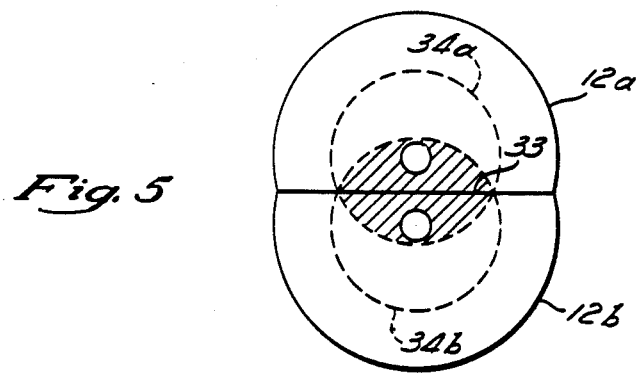
FIG. 5 is a schematic diagram showing the evanescent fields of the pair of fibers overlapping at the interaction region.

An interaction or coupling region 32 is formed at the junction of the strands 12, in which light is transferred between the strands by evanescent field coupling. It has been found that, to insure proper evanescent field coupling, the amount of material removed from the fibers 12 must be carefully controlled so that the spacing between the core portions of the strands 12 is within a predetermined "critical zone". The evanescent fields extend into the cladding and decrease rapidly with distance outside their respective cores. Thus, sufficient material should be removed to permit each core to be positioned substantially within the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 12 is within the critical zone, each strand receives a significant portion of the evanescent field energy from the other strand, and optimum coupling is achieved without significant energy loss. The critical zone is illustrated schematically in FIG. 5 as including that area, designated by the reference numeral 33, in which the evanescent fields, designated by reference numerals 34a and 34b, of the fibers 12a and 12b, respectively, overlap with sufficient strength to provide coupling, i.e., each core is within the evanescent field of the other. However, as previously indicated, mode perturbation occurs within the area 33 when the cores are brought too close together. For example, it is believed that, for weakly guided modes, such as the $HE_{11}$ mode in single mode fibers, or high order modes in multi-mode fibers, such mode perturbation begins to occur when sufficient material is removed from the fibers 12 to expose their cores. Thus, the critical zone is defined as that area in which the evanescent fields 34 overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single mode fiber having a step-index profile, the critical zone can be quite narrow. In a single mode fiber coupler of the type shown in FIGS. 1-4, for example, the required center-to-center spacing between the strands 12 at the center of the coupler is typically less than a few (e.g. 2-3) core diameters.

Typically, the strands 12a and 12b are (1) identical to each other, (2) have the same radius of curvature at the interaction region 32, and (3) have an equal amount of fiber optic material removed therefrom to form their respective facing surfaces 18a and 18b. Thus, the fibers 12 are symmetrical, through the interaction region 32, in the plane of the facing surfaces 18, so that the facing surfaces 18 are coextensive if superimposed. This insures that the two fibers 12a and 12b will have the same propagation characteristics at the interaction region 32, and thereby avoids coupling attenuation associated with dissimilar propagation characteristics.

The blocks or bases 12 may be fabricated of any suitable rigid material. In a typical coupler, the bases 12 comprise generally rectangular blocks of fused quartz glass approximately one inch long, one inch wide, and 0.4 inches thick. The fiber optic strands 12 are typically secured in the slots 13 by suitable cement 38, such as epoxy glue. One advantage of the fused quartz blocks 16 is that they have a coefficient of thermal expansion similar to that of glass fibers, and this advantage is particularly important if the blocks 16 and fibers 12 are subjected to any heat treatment during the manufacturing process. Another suitable material for the block 16 is silicon, which also has excellent thermal properties for this applicaton.

OPERATION OF THE COUPLER 10

The coupler 10 includes four ports, labeled A, B, C, and D in FIG. 1. When viewed from the perspective of FIG. 1, ports A and C, which correspond to strands 12a and 12b, respectively, are on the lefthand side of the coupler 10, while the ports B and D, which correspond to the strands 12a and 12b, respectively, are on the righthand side of the coupler 10. For the purposes of discussion, it will be assumed that input light of a suitable wavelength (e.g., 1.15 microns) is applied to port A. This light passes through the coupler and is output at port B and/or port D, depending upon the amount of power that is coupled between the strands 12. In this regard, the term "normalized coupled power" is defined as the ratio of the coupled power to the total output power. In the above example, the normalized coupled power would be equal to the ratio of the power at port D to the sum of the power output at ports B and D. This ratio is also referred to as the "coupling efficiency", and when so used is typically expressed as a percent. Thus, when the term "normalized coupled power" is used herein, it should be understood that the corresponding coupling efficiency is equal to the normalized coupled power times one-hundred. In this regard, tests have shown that an evanescent coupler 10 may have a coupling efficiency of up to one-hundred percent. However, it will also be seen that the coupler 10 may be "tuned" to adjust the coupling efficiency to any desired value between zero and the maximum.

Furthermore, an evanescent coupler 10 is highly directional, with substantially all of the power applied at one side of the coupler being delivered to the other side of the coupler. The coupler directivity is defined as the ratio of the power at port D to the power at port C, with the input applied to port A. Tests have shown that the directionally coupled power (at port D) is greater than 60 dB above the contradirectionally coupled power (at port C). Further, the coupler directivity is symmetrical. That is, the coupler operates with the same characteristics regardless of which side of the coupler is the input side and which side is the output side. Moreover, the coupler 10 achieves these results with very low throughput losses. The throughput loss is defined as the ratio of the total output power (ports B and D) to the input power (port A), subtracted from one (i.e., $1-(P_B+P_D)/P_A$). Experimental results show that throughput losses of 0.2 dB have been obtained, although losses of 0.5 dB are more common. Moreover, these tests indicate that the coupler 10 operates substantially independently of the polarization of the input light applied.

The coupler 10 operates on evanescent field coupling principles in which guided modes of the strands 12 interact, through their evanescent fields, to cause light to be transferred between the strands 12. As previously indicated, this transfer of light occurs at the interaction region 32. The amount of light transferred is dependent upon the proximity and orientation of the cores, as well as the effective length of the interaction region 32. The length of the region 32 is, in turn, dependent upon the radius of curvature of the fibers 12, and, to a limited extent, the core spacing, although it has been found that the effective length of the interaction region 32 is substantially independent of core spacing. In one typical coupler 10, employing an edge-to-edge core spacing of about 1.4 microns, the radius of curvature is on the order of 25 centimeters, and the effective interaction region is approximately one millimeter long at a signal wavelength of 633 nm. With these dimensions, the light makes only one transfer between the strands 12 as it travels through the interaction region 32. However, if the length of the interaction region 32 is increased, or core spacing decreased, a phenomenon referred to herein as "overcoupling" will occur, in which the light will transfer back to the strand from which it originated. As the interaction length is further increased, and/or the core spacing further decreased, the light transfers back to the other strand. Thus, the light may make multiple transfers back and forth between the two strands 12 and it travels through the region 32, the number of such transfers being dependent on the length of the interaction region 32, and the core spacing.

Figure 6:
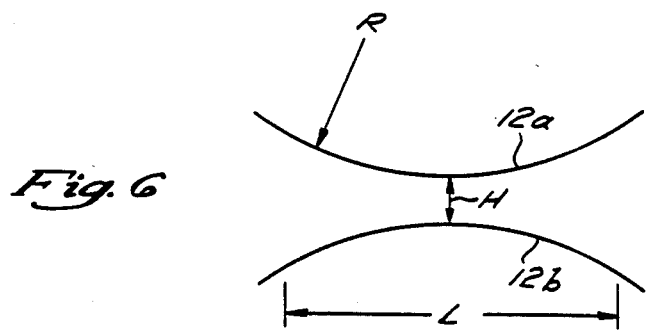
FIG. 6 is a schematic drawing of the coupler of FIG. 1, illustrating the radius of curvature, core spacing, and interaction length, as being parameters of the coupler.

The foregoing may be more fully understood through reference to FIG. 6 which shows a schematic representation of the coupler 10 of FIG. 1. The cores of fibers 12a and 12b are shown as gradually converging to a minimum spacing, labeled H, at the center of the coupler and diverging towards the edges of the coupler. The effective interaction length is labeled L and the radius of curvature of the strands 12a and 12b is labeled R. As indicated above, it has been found that, while the effective interaction length L is a junction of the radius of curvature R, it is substantially independent of the minimum spacing H between the fibers 12. Although this independence is truly valid only for relatively large core spacings and short wavelengths, it provides a good approximation for most applications, and thus, it advantageously permits the coupler, illustrated in FIG. 6, to be analyzed as an "equivalent" coupler comprising two parallel wave guides, separated through their interaction length L, by a spacing H, as shown in FIG. 7.

Figure 7:
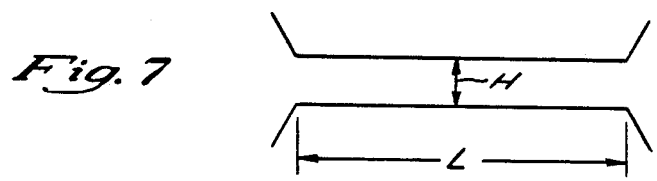
FIG. 7 is a schematic drawing of an "equivalent" coupler.
Figure 8:
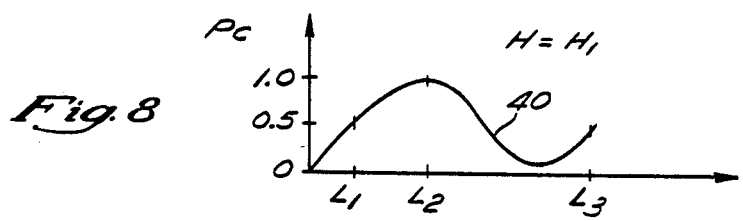
FIG. 8 is a graph of normalized coupled power as a function of interaction length for a given fiber core spacing.
Figure 9:
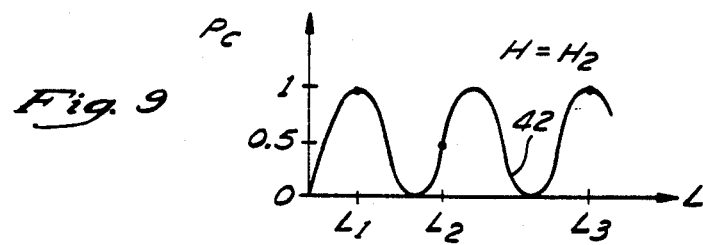
FIG. 9 is a graph of normalized coupled power as a function of interaction length for another fiber core spacing.

The effects of varying either the effective interaction length L or the fiber spacing H of the "equivalent" coupler shown in FIG. 7 may be understood through reference to FIGS. 8 and 9. FIG. 8 shows a sinusoidal curve 40 which illustrates that the coupled power $P_C$ varies sinusoidally as a function of the interaction length L for a given Fiber spacing H1. At this fiber spacing, it may be seen that the coupled power is approximately fifty-percent when the interaction length is equal to L1, and increases to one-hundred-percent when the interaction length increases to L2. If the interaction length is further increased, "overcoupling" results, in which light is transferred back to the strand from which it originated, and the coupled power $P_C$ begins to decrease towards zero. The coupled power then increases from zero to, for example, fifty percent at L3. Thus, it may be seen that the amount of coupling my be varied by changing the effective length of the interaction region.

The effect of decreasing the spacing H between the fibers is to increase the strength of the coupling, and thus, increase the amount of light transferred over a given interaction length L, as shown by comparing the sinusoidal curve 42 of FIG. 9 with the sinusoidal curve of FIG. 8. For example, if the fiber spacing were decreased from $H_1$ (FIG. 8) to $H_2$ (FIG. 9), the coupled power may be one-hundred percent at interaction length L1 in FIG. 9, as compared to fifty percent for the same interaction length L1 in FIG. 8. The curve 42 then begins to demonstrate overcoupling and the coupled power decreases to fifty percent at interaction length L2. At interaction length L3, the curve 42 indicates that the coupled power is again one-hundred percent. Thus, for a given interaction length (e.g., L1, L2, or L3), the amount of power coupled may be adjusted by changing the fiber core spacing.

Figure 10:
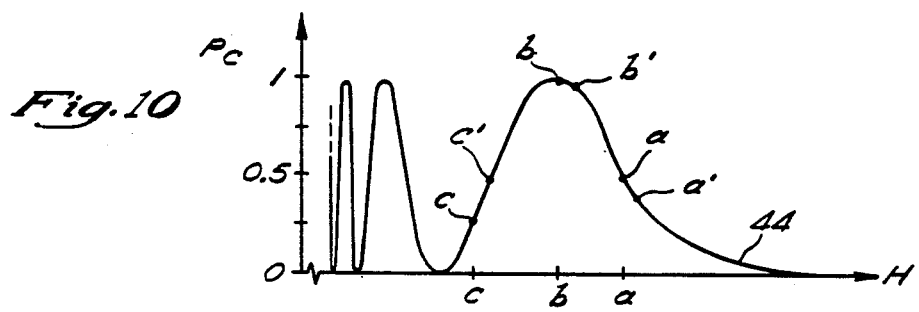
FIG. 10 is a graph of normalized coupled power as a junction of minimum fiber core spacing (spacing surfaces superimposed)

The relationship between the minimum fiber spacing H and the coupled power $P_C$ for a given interaction length L (i.e., radius of curvature) is illustrated in FIG. 10 by the curve 44. As shown in this figure, the normalized coupled power oscillates between 0 and 1 with increasing frequency or the core spacing H decreases. The reference points a, b, and c on the curve H were chosen somewhat arbitrarily to indicate normalized coupled power of 0.5, 1.0, and 0.25, respectively. It will be recognized that at point "a" fifty percent of the power is coupled from one to the other. At point "b" full coupling is achieved, and one-hundred percent of the optical power is transferred between the strands. Point "c", on the other hand, represents an overcoupled condition wherein the coupled power has decreased from full coupling to twenty-five percent.

TUNING THE COUPLER 10

The foregoing concepts are useful in understanding the "tunability" aspects of the coupler 10. As used herein, the term "tuning" is defined as translating the fibers 12 relative to each other to adjust the power coupled therebetween. Such translation of the fibers 12 is accomplished by sliding the planar facing surfaces 18 relative to each other, so that they are offset, rather than superimposed. That is, the fibers 12 are mutually displaced in the plane of the planar facing surfaces. Viewed another way, such translation occurs when respective planes in which each of the fibers lie, are displaced relative to each other.

Figure 11:
FIG. 11 is a schematic representation of the oval-shaped facing surfaces of the fibers, showing the facing surfaces laterally offset.

In one method of fiber translation, the facing surfaces 18 are offset laterally. As used herein, the term "laterally offset" means sliding the facing surfaces 18 laterally from their superimposed position to increase the spacing between the fiber cores, while maintaining a substantially parallel relationship between the fibers 12. Such lateral offset of the facing surfaces 18 is illustrated schematically in FIG. 11. The effect of such lateral offset is, of course, to change the spacing between the cores of the fibers 12.

Figure 12:
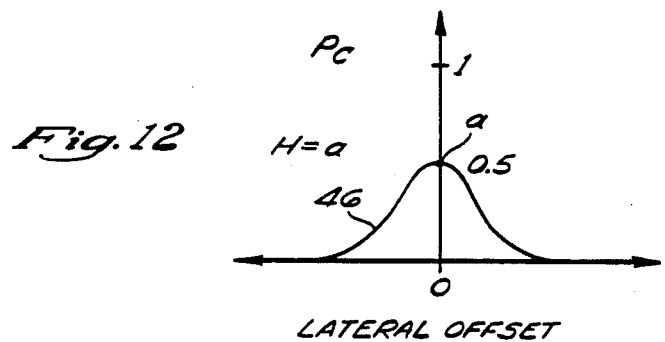
FIG. 12 is a graph of normalized coupled power as a function of lateral offset for a first minimum fiber core spacing.

The curve 46 of FIG. 12 graphically illustrates the effect of laterally offsetting the fiber facing surfaces 18 for a coupler having a minimum edge-to-edge core spacing H equal to "a" (FIG. 10). When the facing surfaces 18 of the fibers are superimposed (i.e., no offset), the normalized coupled power will be equal to 0.5, as required by the curve 44 of FIG. 10. However, when the facing surfaces of the fibers 12 are laterally offset in either direction to increase the spacing between the cores, the coupled power gradually decreases to zero.

Figure 13:
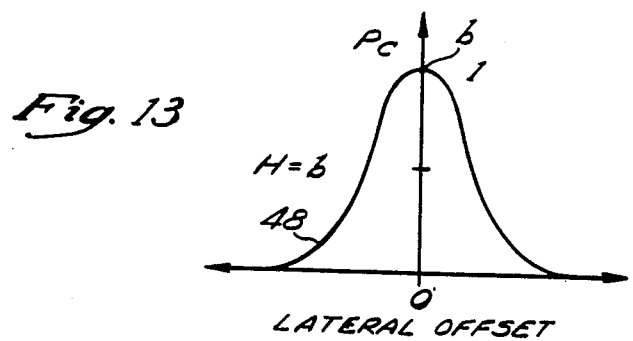
FIG. 13 is a graph of normalized coupled power as a function of lateral offset for a second fiber core spacing.

Referring now to the curve 48 of FIG. 13, the effect of lateral fiber offset upon normalized coupled power for a coupler having an edge-to-edge core spacing equal to "b" (FIG. 10) is shown. When there is no offset and the facing surfaces 18 are superimposed, the normalized coupled power is 1.0, as required by the curve 44 of FIG. 10, however, as the facing surfaces 18 of the fibers 12 are laterally offset in either direction, the coupled power gradually decreases.

Figure 14:
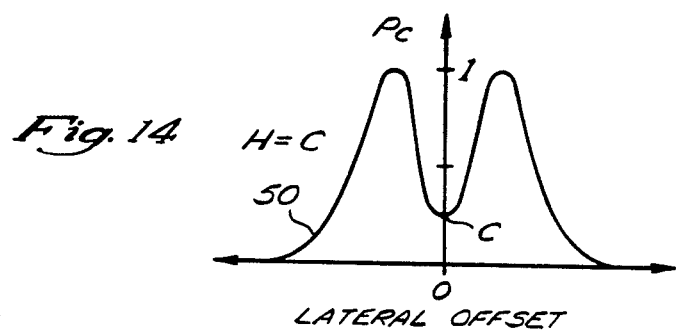
FIG. 14 is a graph of normalized coupled power as a function of lateral offset for a third fiber core spacing.

The curve 50 of FIG. 14 shows coupled power as a function of relative fiber offset for a core spacing equal to "c" (FIG. 10), which, as will be recalled, represents an overcoupled condition. From this curve 50, it may be seen that, when the facing surfaces 18 of the fibers 12 are superimposed, the normalized coupled power is 0.25. As the core spacing is increased by sliding the facing surfaces 18 so that they are laterally offset, the normalized coupled power initially increases to 1.0 and then decreases toward zero when the core spacing is further increased.

In all of the foregoing cases illustrated by FIGS. 12, 13 and 14, the coupled power decreases to zero at the substantially same lateral offset, assuming that the physical dimensions of the couplers corresponding to these figures are identical except for their fiber spacing at zero offset. By comparing the curves 46, 48 and 50 of the FIGS. 12, 13 and 14, respectively, it may be seen that the respective slopes of these curves tend to increase as the core spacing decreases. Thus, the sensitivity of the coupler to lateral offset increases as the core spacing decreases. For example, a coupler fabricated to exhibit overcoupling, as in FIG. 14, is significantly more sensitive to lateral offset than couplers having the characteristics shown in either FIGS. 12 or 13. This feature of the present invention is quite advantageous, since, in the switch application of the present invention, low sensitivity and high stability are typically desirable. Thus, a coupler having coupling characteristics similar to those of FIGS. 12 and 13 (i.e., not overcoupled) is more appropriate for this application.

Figure 15:
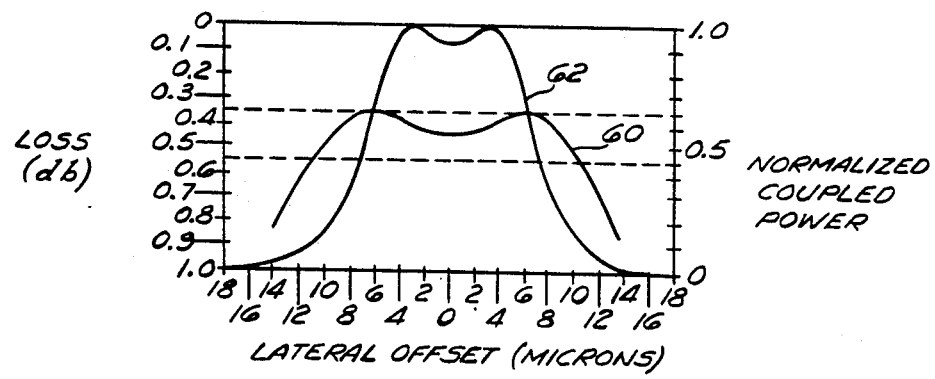
FIG. 15 is a graph of (a) normalized coupled power as a function of lateral offset and (b) throughput loss as a function of lateral offset for one exemplary coupler showing that the throughput loss is substantially constant over substantially the entire range of normalized coupled power.

Experimental evidence indicates that the throughput losses of the coupler 10 are substantially constant, except when the lateral offset of the cores is relatively large. Tests on one exemplary coupler showed that the throughput loss was within 0.2 dB of the minimum loss for a lateral offset of up to 10 microns in either direction. This coupler utilized a single mode fiber having a core index of 1.460, a cladding index of 1.4559, and a core diameter of four microns. The radius of curvature of the fibers was 25 centimeters, the edge-to-edge core spacing was approximately 0.9 microns, and the wavelength of the light utilized was 632.8 nm. FIG. 15 shows, for this exemplary coupler, a graph of throughput loss, designated by the reference numeral 60, and a graph of the normalized coupled power, designated by the reference numeral 62, both as a function of lateral offset of the facing surfaces 18. The two horizontal broken lines drawn through the center of FIG. 14 provide the upper and lower boundaries of an 0.2 dB power loss band. It may be seen that the power loss curve 60 is within this band for lateral offsets up to about 12 microns in either direction. Further, it may be seen that, at a 12-micron lateral offset, the normalized coupled power is approximately 0.1. Thus, for coupled power between 0.1 the power loss is within about 0.2 dB of the minimum power loss. If the power loss band is expanded to 0.5 dB, the power loss band is within the 0.5-dB band for fiber offsets of up to 15 microns, which corresponds to a coupled power of less than 0.05 (i.e. 5 percent). Thus, this coupler exhibits substantially constant throughput losses, i.e., within a relatively narrow power loss band width, throughout substantially the entire operating range of the device. Further, it is significant that the throughput losses are very low, and relatively constant for coupled power between ten percent and one-hundred percent.

CONSTRUCTION OF FIBER OPTIC SWITCH

Figure 16:
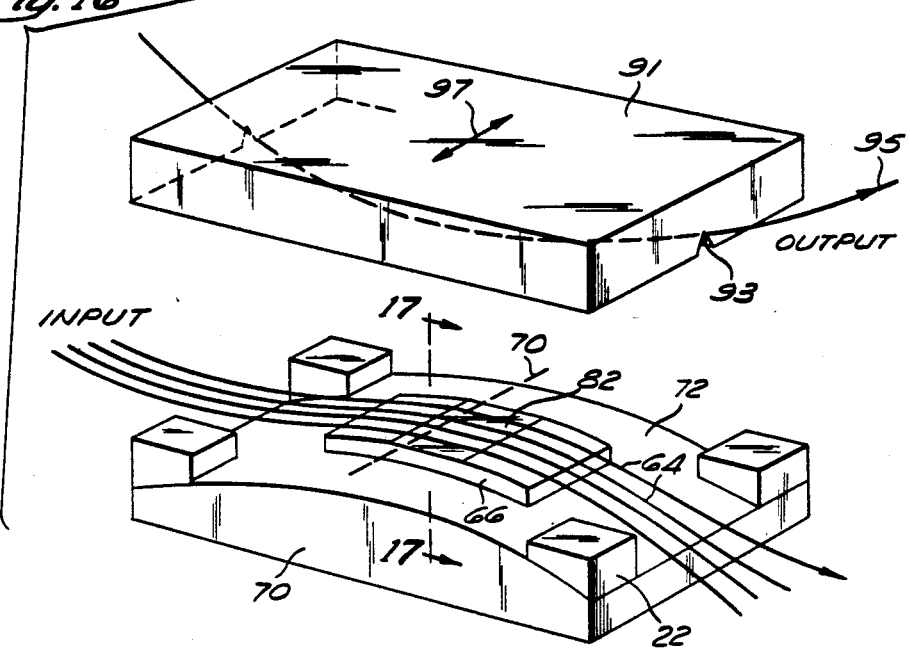
FIG. 16 is an exploded perspective view of the switch of this invention.
Figure 17:
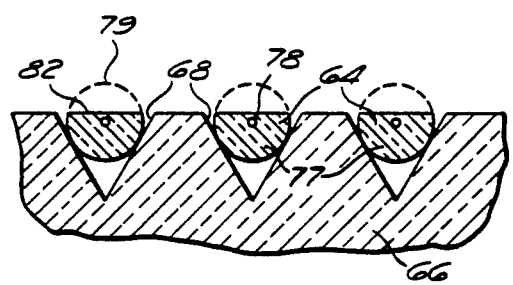
FIG. 17 is a sectional view taken along line 17—17 of FIG. 16.

The present invention is illustrated in FIGS. 16 and 17 which shows plural optical fibers 64 mounted on a chip 66 with individual v-grooves 68 to receive each optical fiber 64. Taps are formed by simultaneously polishing the fibers and the chip 66, so that each of the optical fibers 64 is tapped at a lateral line 70. Before a description of the manner of formation of the taps on the optical fibers 64, it is necessary to describe the construction of the chip 66 and the manner by which the optical fibers 64 are laid in the v-grooves 68 in the chip 66.

Figure 18:
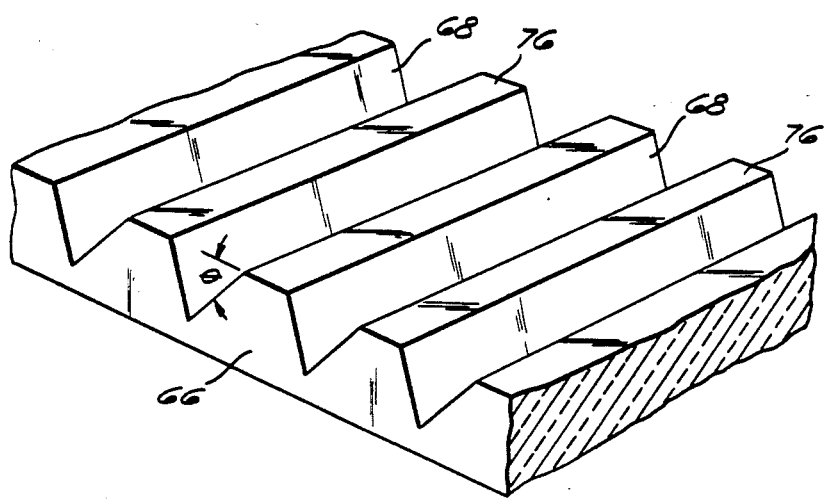
FIG. 18 is a perspective view of a portion of the grooved chip used to properly align the optical fiber windings.

Referring to FIG. 18, a portion of the chip 66 with the completed v-grooves 68 is shown. It is desirable that each of these v-grooves 68 be identical in width and depth, since the fibers are to be coplanar because the taps in the fibers in these v-grooves will be constructed simultaneously. If the v-grooves are identical, the taps on the fibers will have uniform characteristics.

Because of this need for great precision in the construction of the v-grooves, the perferred material for the chip 66 is silicon, which can be etched by photolithographic techniques, rather than some other material in which grooves are machined. The type of silicon used is commercially available 100 oriented silicon, because when the surface of this type of silicon is subjected to an etching solution, the surface dissolves at an angle theta, as shown in FIG. 18. For 100 oriented silicon the angle theta is 54.74 degrees.

Figure 19:
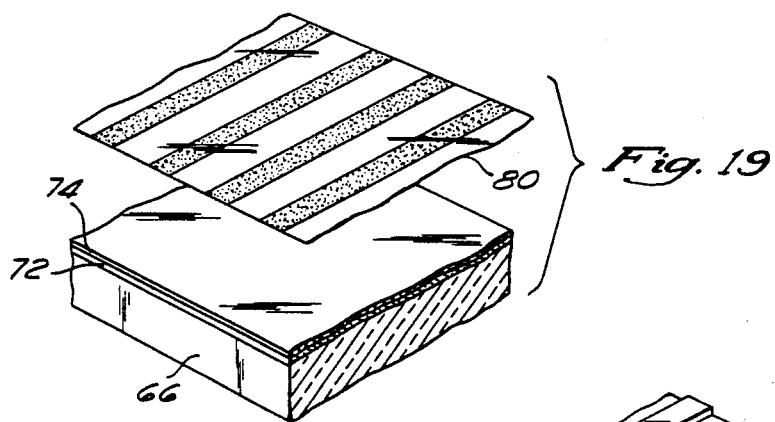
FIG. 19 is a perspective view illustrating the photolithographic technique utilized to achieve precise alignment of the v-grooves.

Therefore, in order to make the v-grooves shown in FIG. 18 in the silicon chip 66, the following photolithographic method may be used. The chip 66 is first heated so that a very thin oxide layer 72 will cover the chip 66, as shown in FIG. 19. The chip 66 is then coated with a photosensitive coating 74 known as photoresist. A mask 80 is then placed over the chip, and the top of the chip is exposed to ultraviolet light. For the mask 80 shown in FIG. 19, positive-acting photoresist is used, so the portions of the photoresist 74 under the opaque sections of the mask 80 will be left to perform the masking function.

Figure 20:
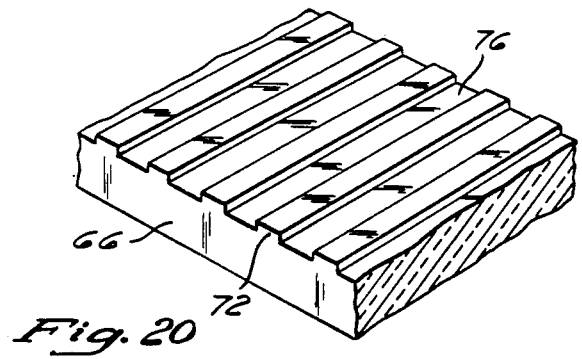
FIG. 20 is a perspective view of a portion of the silicon wafer ready to be etched.

The next step is to etch away the photoresist 74 and oxide layer 72 which were under the non-opaque portions of the mask 80 by using a buffered hydrochloric acid solution. The remaining photoresist is then stripped by use of a special solvent, and the chip 66 will appear as it does in FIG. 20, covered by a mask of the oxide layer 72. The silicon wafer 66 is then placed into an anisotropic etching solution, commonly potassium hydroxide solution. The portions of the chip not covered by the oxide layer 72 will then be dissolved by the etching solution at an angle of 54.74 degrees from the surface 76 of the chip 66. The etch will develop as a flat-bottom groove until the two angled planes intersect and a true v-groove is formed, as shown in FIG. 18. This photolithographic technique is well-known in the art, and has been used extensively in the manufacture of semiconductors.

The size of the groove 68 to be etched in the silicon chip 66 of course, depends on the optical fiber being used. There are two widely-used types of single mode optical fiber, one manufactured by ITT which has a diameter of about 80 microns (400 microns including the plastic jacket), and a second brand of fiber manufactured by Corning which is 125 microns in diameter (135 microns with the lacquer jacket). Which of these or other fibers is used depends on the wavelength of the light to be used; if visible light is to be used, the ITT fiber is acceptable since it is single mode at visible light wavelengths (longer than green); and if infrared light is to be used, the Corning fiber is acceptable since it is single mode at infrared wavelengths.

Referring again to FIG. 16, in order to construct optical taps on the fibers 64, it is desirable to have the optical fibers 64 mounted in a curved configuration so that a selected portion of the optical fibers 64 may be lapped. Therefore, the silicon chip 66 is mounted on a block of quartz 70 which has a curved upper surface 72. It has been found that a silicon chip 66 of standard thickness (0.25 millimeter) and about three-centimeter length can be bent without breaking around a twelve-inch radius. An adhesive substance such as wax is used to hold the silicon chip 66 on the quartz block 70 in the curved configuration shown in FIG. 16.

Before the optical fibers 64 can be mounted in the v-grooves 68 in the silicon chip 66, the portions of the optical fibers 64 which are to be mounted in the v-grooves 68 preferably have the protective jacket removed. The ITT fiber has a plastic jacket which may be removed by dipping it in sulfuric acid. The resiliency of the plastic jacket prevents precision in the lapping operation, so it should be removed. The Corning fiber has a lacquer jacket which may be removed by dipping it in acetone. Since the lacquer jacket is more solid than the plastic jacket, its removal is preferential rather than mandatory.

The installation of the fibers 64 in the v-grooves 68 of the silicon chip 66 is best shown in FIG. 17. An adhesive 77 is placed in the bottom of each v-groove 68. An optical fiber 64 is then placed in each v-groove 68 and placed in tension so that the optical fiber 64 bottoms out against the sides of the v groove 68 to be permanently retained there by the adhesive 76.

The next step is to lap the upper surface of the optical fibers 64 at the lateral line 70. This lapping operation will remove a portion of the cladding 79, as best shown in FIG. 17. It is important to note that not all of the cladding material 76 around the core 78 of the optical fiber 64 is to be removed. The distance between the core 78 and the lapped surface 82 depends on the characteristics of the coupler to be formed, in accordance with the previous description. The quartz block 70 advantageously includes plural spacing elements 22 which are used to stabilize the chip 66 during polishing and to provide a bearing surface for the second half of the switch.

The second half of the switch is preferably formed of a quartz block 91 including a groove 93 as earlier described for a standard coupler. As can be seen from FIG. 16 the groove 83 has a relatively large radius of curvature, peaking at the center of the substrate 91. An optical fiber 95 is placed within the groove 93 and secured using epoxy or any other satisfactory adhesive. This fiber is then lapped at the highest point of the curve along with the surface of the quartz block 91 to yield a planar surface for the cladding, which is a few microns separated from the core of the fiber, and which is co-planar with the surface of the quartz block 91.

An index matching oil is then placed on the polished flat surface 82 of the silicon substrate 66. In this case, the index matching oil advantageously has an index of refraction slightly lower than that of the cladding 79 of the fiber elements 64 and the fiber cores 78 themselves to prevent loss of light outside of the coupling area.

If the fibers 64 on the lower substrate 66 are independent fibers, the construction shown in FIG. 16 provides an optical switch. Switching is accomplished by aligning the core of the upper fiber 95 with the desired lower fiber 64 core. When a different fiber 64 on the lower substrate 66 is to be selected as the input or output fiber, an operator merely adjusts the position of the upper quartz block 91 in the lateral direction (arrow 97) relative the axis of the fiber 95 with respect to the lower substrate 66 so that the upper fiber 95 is in alignment with the desired lower fiber 64. Adjustable coupling with respect to each of the fibers 64 can be obtained by positioning the upper substrate 91 such that the fiber 95 is slightly offset from the selected fiber 64. Also, as previously mentioned, coupling can be varied by orienting the upper fiber 95 at an angle with respect to the desired lower fiber 64. In lapping the lower fibers 64 it is possible that the distance from the top flat face 82 of the fiber cladding 79 and the fiber core 78 may be slightly different for different fibers 64. This would yield a different coupling ratio for the various fibers 64. By adjusting laterally the position of the upper fiber 95, the coupling ratio can be maintained constant at each switch position.

FIG. 21 shows a fixture for permitting accurate adjustment of the upper substrate 91 with respect to the lower substrate 66 to accomplish the previously described switching function. The quartz block 70 is fixed in a lower trough created by a pair of walls 102 and 104 of a frame 106. The wall 104 is slightly lower in height than the edge of the block 70 of the switch. A pair of ledges 108 above the walls 102 and 104 are wide enough to permit at least half the width of the substrate 91 to slide over them. An upper wall 110 supports two spring members 112 which maintain the upper substrate 91 biased away from the wall 110. A pair of micrometers 114 and 116 are mounted in the frame 106. The micrometer 114 bears upon the upper substrate 91 of the switch against a spring 112 and is adjusted to change the optical coupling from one fiber 64 to a different fiber 64. The micrometer 114 is centrally located on the side of the substrate 91 to permit this lateral adjustment without rotation of the substrate 91. The micrometer 116 is offset on the upper substrate 91 so that it can be used to adjust the angular orientation of the upper substrate 91 with respect to the lower substrate 70.

Using a construction quite similar to that described with respect to the fiber optic switch, a discretely variable optical delay line, shown in FIG. 22, can be made. As with the switch, the upper substrate 91 of the optical delay line is made of quartz and has a v-groove 93 with a fiber 95 secured therein. This fiber is lapped to within a few microns of its core, just as the fiber in the switch.

The lower portion is formed with a quartz base 70 and a v-groove silicon substrate 66. The major difference is that there is only a single fiber 121 which is wrapped in helical fashion around the base 70 of the delay line. The first loop of fiber 121 is placed in the first v-groove 68. The next loop is placed in the next v-groove 68, and so on until all the v-grooves 78 are filled. When the two portions of the variable delay line are assembled in the manner described with respect to the switch, it can be seen that, by laterally adjusting substrate 91, the fiber 95 can be coupled with any one of the loops of the fiber 121. Thus, by moving substrate 91, different amounts of delay can be obtained. Thus, a discretely variable delay line has been discribed. The mechanism for changing the position of the upper substrate 91 of the delay line can take the form suggested previously in FIG. 21 for the switch.

FIG. 23 shows a graph of exemplary possible delays in the case of a 7-loop delay line of the type described above. The first graph shows the time at which an input light pulse is introduced into the fiber 121. The shortest delay is provided by aligning the upper fiber 95 with the tapped portion of the fiber 121 closest to the light source, and is illustrated in the next lower graph. The next three graphs depict the output of the delay line when the upper fiber 95 is aligned, respectively, with loops 3, 5 and 7 of the fiber 121. It can be seen that the difference between the delay at the first tap on the fiber 121 and the delay at the third tap on the fiber 121 is approximately 5 nanoseconds.

FIG. 24 shows schematically the use of the variable delay line of this invention in a tuneable filter. A modulated light source is shown as a laser diode input 123. Light from the diode 123 is coupled to the fiber 95 on the upper substrate 91 (FIG. 22) of the adjustable delay line. Each of the coupling points 125 along the length of the fiber 121 of the variable delay line provides a different delay as previously described. Fiber 95 can be adjusted to couple at any of the coupling points 125. In the filter shown in FIG. 4, the fibers 95 and 121 are polished so that the amount of coupling at each of these points 125 is 3DB. Thus, half of the power input by the laser diode 123 will remain in fiber 95, while the other half will be coupled into fiber 121. Fibers 95 and 121 extend through another 3DB directional coupler 127 which acts to recombine the two light signals for detection by a detector 129.

The filter shown in FIG. 24 has an impulse response consisting of two equal pulses separated in time by the relative delay nT-P where T is the delay of each loop between successive taps 125, n is the number of the loops between the coupling point 125 which is aligned with the fiber 95 and the coupler 127 and P is the difference in delay between the fibers connecting the coupler 127 to the coupling point on the fiber 95 and the last tap 125 of the fiber 121. The Fourier transform of this impulse response is a cosign function whose first zero is at F=1/(2nT-P). The filter in FIG. 24 will have this transfer characteristic provided the coherence length of the source 123 is short compared to the delay difference nT-P. Fixed filters of this type have been demonstrated with as many as 1,300 overtones or harmonics. FIGS. 25A-25C show the frequency response of the filter of FIG. 24. The upper trace in these figures is the frequency response of the laser diode 123 and the detector 129. The lower trace in FIG. 6A is the response for the minimum relative delay of 0.6 nanoseconds. An intermediate delay, 2.5−0.6=1.9 nanoseconds, is shown in FIG. 6B. and the maximum delay of 15−0.6=14.4 nanoseconds is shown in FIG. 6C. The maximum delay in such discretely variable delay lines can be made vary large since the attenuation and dispersion of optical fibers is low. The minimum delay between taps is limited to about 100 picoseconds by bending loss around the loop and by fabrication considerations.

FIG. 32 shows how the discretely variable delay line of FIG. 16 can be converted into a continuously variable delay line for at least for a small range of delay. This is accomplished by making the radius of curvature of the first substrate 66 substantially larger than the radius of curvature of the second substrate 91. Thus, as an example, the second substrate 91 with the single fiber 95 might have a radius of curvature of approximately 25 centimeters. When lapped and polished the fiber 95 would have an interaction region length of approximately one millimeter. The radius of curvature of the first substrate 66 might, for example, be approximately 50 centimeters. When the first substrate 66 is lapped and polished the interaction region will be substantially longer than the inneraction region for the second substrate. Thus, when the fiber 95 of the second substrate 91 is aligned with any one of the fibers 64 in the interaction region of the first substrate 66 this second substrate fiber 95 may be adjusted along the length of the first substrate interaction region. This movement along the length effectively acts to change the length through which the light travels and thus provides a continuously variable delay. The amount of this delay is easily calculated. For example, if the interaction region of the first substrate 66 has a length of one centimeter, the variable delay possible is a range of from 0 to 50 picoseconds. Although FIG. 32 depicts the continuously variable delay line as part of a discretely variable delay line element, the continuously variable delay line could be constructed using only a single, large radius of curvature v-groove 68 and fiber 64 on the first substrate 66.

FIG. 26 shows a side view of the continuously variable fiber optic delay line. In this view the difference in the radii of curvature between the first substrate 66 and the second substrate 91 is apparent. Also from this drawing it can be seen that, as the second substrate 91 is moved longitudinally along the first substrate 66, while maintaining coupling with the fiber 64 in the first substrate 66, the distance between the cores of fibers 95 and 64 will vary somewhat because the core of the fiber 64 is slightly curved. This difference in distance will cause some difference in coupling. For many applications the difference in coupling will be insignificant. However, if it is imperative that the coupling be identical for all delays, the amount of coupling can be varied as needed by moving the second substrate 91 laterally with respect to the first substrate 66. As mentioned previously, such movement acts to change the coupling between the two fibers 95, 64.

In order to avoid stripping of the light from the fiber 64 over the long interaction portion of the fiber, it is important to use index matching oil and epoxy which have indicies of refraction lower than that of the cladding of fiber 64. Another way to avoid the stripping problem is to orient the second substrate 91 at a slight angle with respect to the first substrate 66 such that the cores themselves are crossed.

The frame shown in FIG. 21 acts to provide the necessary relative motion between the first substrate 66 and the second substrate 91. Movement of the substrate 91 laterally and angularly with respect to substrate 66 has been described previously in this application. The substrate 66 is held in place longitudinally by pins, such as the pin 128. The substrate 91 is moved longitudinally over the substrate 66 by rotating a knob 130. The knob 130 is mechanically coupled to blocks 132 and 134 to move them in unison longitudinally across a block 136 as needed. The blocks 132, 134 and 136 include dovetail joints 138 to maintain alignment of these elements during such adjustment. When the blocks 132 and 134 are moved, the pressure of the micrometers 114, 116 and springs 112 on the second substrate 91 acts to hold this substrate 91 such that it will be moved along with the blocks 132 and 134.

FIGS. 27 through 29 show a continuously variable delay line wherein the radius of curvature of the first substrate 66 is infinitely large (i.e., a portion of the substrate 66 is flat). Although this is somewhat more difficult to construct, placement of the fiber 64 into a flat silicon v-groove eleminates changes in coupling between the fibers 95 and 64 along the length of the fiber 64. Thus, as the second substrate 95 is moved across the flat substrate 66, the distance between the cores of the fibers 91, 64 will remain constant.

FIGS. 28 and 29 show maximum and minimum delay, respectively, for this device. The means for moving the second substrate 91 with respect to the first substrate 66 is a micrometer 142. This micrometer 142, as well as the devices for moving the substrates with respect to one another shown in FIG. 21, can be motorized or servoed in any well-known manner.

FIGS. 30 and 31 show two arrangements for achieving a wide range of continuously variable delay, using a combination of a discretely variable delay element and a continuously variable delay element. In FIG. 30 it can be seen that the first element in the delay line is a discretely variable delay wherein each loop delay is equal to T. In series with this discretely variable delay is a continuously variable delay line wherein the variable delay is from zero to T. The continuously variable delay may be provided by combining a plurality of continuously variable delay elements which provide shorter periods of delay in series with each other until they provide a total continuous delay equal to T. FIG. 31 is an example of how the combination discrete and variable delay of FIG. 32 may be used in series with a discretely variable delay to provide a continuously variable delay over a wide range of time periods. The combination device would have a discretely variable delay wherein each loop delay is P. The continuous delay of the combination device would be from zero to P/4. The discretely variable delay line which is placed in series with the combination delay line would have a loop delay of P/8. This would act to provide a continuous variable delay line over a period of delay equal to N×P where N is the number of loops in the combination delay device.

We claim:

1. A continuously variable delay line, comprising:
    a first single mode optical fiber (64) having an evanescent field coupling region;
    a second single mode optical fiber (95) having an evanescent field coupling region, said coupling region of said first fiber substantially longer than said coupling region of said second fiber;
    means (66, 91) for mounting said fibers with said coupling regions juxtaposed, said mounting means including means (142) for relatively moving said first fiber and said second fiber in a direction substantially parallel to the axis of one of said fibers, while maintaining juxtaposition of said coupling regions.

2. A continuously variable delay line, as defined by claim 1, wherein one of said first and second single mode fibers includes a second evanescent field coupling region (125), and wherein said mounting means comprises means (114) for selectively juxtaposing said coupling region of the other of said first and second fiber with either said coupling region or said second coupling region of said one fiber.

3. A continuously variable delay line, as defined by claim 1, wherein said coupling regions are formed by removing a portion of the cladding (97) from one side of said fibers to form respective facing surfaces.

4. A continuously variable delay line, as defined by claim 1, wherein said mounting means comprises:
    a first substrate (66), having a groove for mounting said first fiber (64); and
    a second substrate (91), having a groove (93) for mounting said second fiber (95).

5. A method of making a continuously variable delay line, comprising:
    removing the cladding (97) from one side of a first single mode optical fiber (95) to form a first planar facing surface;
    removing the cladding from one side of a second single mode optical fiber (64) to form a second planar facing surface;
    said second facing surface substantially longer than said first facing surface;
    mounting said first and second fibers on first and second substrates (91, 66), respectively, so that said first and second planar facing surfaces are coplanar with first and second planar surfaces, respectively, of said first and second substrates, respectively: and
    mounting said planar substrates for relative movement, with said planar surfaces juxtaposed, to permit adjustment of said second facing surface along said first facing surface.

* * * * *